US008756541B2

(12) United States Patent
Cho et al.

(10) Patent No.: US 8,756,541 B2
(45) Date of Patent: Jun. 17, 2014

(54) RELATIVE ORDERING CIRCUIT SYNTHESIS

(75) Inventors: Minsik Cho, Austin, TX (US); Ruchir Puri, Baldwin Place, NY (US); Haoxing Ren, Austin, TX (US); Xiaoping Tang, Mohegan Lake, NY (US); Hua Xiang, Ossining, NY (US); Matthew Mantell Ziegler, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/431,368

(22) Filed: Mar. 27, 2012

(65) Prior Publication Data

US 2013/0263068 A1   Oct. 3, 2013

(51) Int. Cl.
*G06F 17/50* (2006.01)

(52) U.S. Cl.
USPC ............................ 716/104; 716/110; 716/119

(58) Field of Classification Search
USPC ......................................... 716/104, 110, 119
See application file for complete search history.

(56) References Cited

U.S. PATENT DOCUMENTS

| | | | |
|---|---|---|---|
| 5,461,577 A | 10/1995 | Shaw et al. | |
| 6,536,028 B1 | 3/2003 | Katsioulas et al. | |
| 7,735,036 B2 | 6/2010 | Dennison et al. | |
| 2005/0278682 A1 | 12/2005 | Dowling | |
| 2009/0254874 A1* | 10/2009 | Bose | 716/6 |
| 2010/0031218 A1* | 2/2010 | Ramsour et al. | 716/10 |
| 2011/0154279 A1* | 6/2011 | Caldwell et al. | 716/103 |
| 2013/0047127 A1* | 2/2013 | Arunachalam | 716/103 |

OTHER PUBLICATIONS

Gajski, D. D., et al., "Specification and Design of Embedded Hardware-Software Systems", Design & Test of Computers, Spring 1995, pp. 53-67, vol. 12, Issue 1, IEEE, Los Alamitos, California, USA.
Childers, B. R., et al., "Custom Wide Counterflow Pipelines for High Performance Embedded Applications", 2000 International Conference on Parallel Architectures and Compilation Techniques (PACT'00), Oct. 15-19, 2000, pp. 57-68, IEEE, Philadelphia, Pennsylvania, USA.
Chen, D., et al., "FPGA Design Automation: A Survey", F9oundations and Trends in Electronic Design Automation, Nov. 2006, 137 pages, vol. 1, No. 3, Carnegie-Mellon University, Pittsburgh, Pennsylvania, USA.

* cited by examiner

*Primary Examiner* — Suresh Memula
(74) *Attorney, Agent, or Firm* — Ference & Associates LLC

(57) ABSTRACT

Systems and methods for relative ordering circuit synthesis are provided herein. One aspect provides for generating at least one circuit design via at least one processor accessible by a computing device; wherein generating at least one circuit design comprises: generating at least one relative order structure based on at least one circuit design layout, the at least one relative order structure comprising at least one placement constraint associated with at least one circuit element; placing the at least one circuit element associated with the at least one placement constraint within a circuit design according to the at least one placement constraint; and placing circuit elements not associated with the at least one placement constraint within the circuit design. Other embodiments and aspects are also described herein.

23 Claims, 14 Drawing Sheets

- Hard constraints
  - No gate overlap
  - Horizontal relationship: A is on the left of B
    - Both A and B are not fixed $x_a + w_a + s_{ab}^x \leq x_b$
    - A is fixed $x_a + w_a + s_{ab}^x \leq L_b^x$
    - B is fixed $L_a^x + w_a + s_{ab}^x \leq x_b$
  - Vertical relationship: A is on the left of B
    - Both A and B are not fixed $y_a + h_a + s_{ab}^y \leq y_b$
    - A is fixed $L_a^y + h_a + s_{ab}^y \leq y_b$
    - B is fixed $y_a + h_a + s_{ab}^y \leq L_b^y$
  - Gates are inside the custom boundary
    $0 \leq x_a$ and $x_a + w_a \leq C_a^w$   $0 \leq y_a$ and $y_a + h_a \leq C_a^h$
  - Alignment constraints
    - Low alignment
      - vertical   $x_a = x_b \Rightarrow x_a \leq x_b$ and $x_b \leq x_a$
      - horizontal $y_a = y_b \Rightarrow y_a \leq y_b$ and $y_b \leq y_a$
    - High alignment
      - vertical   $x_a + w_a = x_b + w_b \Rightarrow x_a + w_a \leq x_b + w_b$ and $x_a + w_a \geq x_b + w_b$
      - horizontal $y_a + h_a = y_b + h_b \Rightarrow y_a + h_a \leq y_b + h_b$ and $y_a + h_a \geq y_b + h_b$
- Soft constraints
  - Minimize the dimensions $W$ and $H$ of soft customs
  - Honor the given gate locations   $|L_a^x - x_a| \leq z_a^x \Rightarrow \begin{cases} -z_a^x \leq L_a^x - x_a \\ L_a^x - x_a \leq z_a^x \end{cases}$   $|L_a^y - y_a| \leq z_a^y \Rightarrow \begin{cases} -z_a^y \leq L_a^y - y_a \\ L_a^y - y_a \leq z_a^y \end{cases}$
  - Center Alignment
    - Horizontal $|x_a + \frac{w_a}{2} - (x_b + \frac{w_b}{2})| \leq d_{ab}^x$
    - Vertical   $|y_a + \frac{h_a}{2} - (y_b + \frac{h_b}{2})| \leq d_{ab}^y$
- Components in the objective function   $\min\{\alpha \cdot W + \beta \cdot H + \lambda \cdot (\sum z_i^x + \sum z_i^y) + \gamma \cdot (\sum d_{ab}^x + \sum d_{mn}^y)\}$

FIG. 8

- Hard constraints
  - No overlap among soft customs
  - Horizontal relationship: A is on the left of B
    - Both A and B are not fixed $C_a^x + C_a^w \leq C_b^x$
    - A is fixed $G_a^x + C_a^w \leq C_b^x$
    - B is fixed $C_a^x + C_a^w \leq G_b^x$
  - Vertical relationship: A is on the left of B
    - Both A and B are not fixed $C_a^y + C_a^h \leq C_b^y$
    - A is fixed $G_a^y + C_a^h \leq C_b^y$
    - B is fixed $C_a^y + C_a^h \leq G_b^y$
  - Customs are inside the chip
    $$xlow \leq C_i^x \text{ and } C_i^x + C_i^w \leq xhigh$$
    $$ylow \leq C_i^y \text{ and } C_i^y + C_i^h \leq yhigh$$
- Soft constraints ← Honor given custom locations
  $$-D_i^x \leq G_i^x - C_i^x \leq D_i^x \qquad D_i^x, D_i^y \geq 0$$
  $$-D_i^y \leq G_i^y - C_i^y \leq D_i^y$$
- Components in the objective function
  $$\mu \cdot \left( \sum D_i^x + \sum D_j^y \right)$$

FIG. 10

RELATIVE ORDERING CIRCUIT SYNTHESIS

FIELD OF THE INVENTION

The subject matter presented herein generally relates to circuit synthesis and processes for custom automated circuit synthesis in particular.

BACKGROUND

Circuit synthesis involves generating electronic circuits comprised of multiple components that implement a specific circuit behavior. In general, the circuit components consist of different sizes and types of logic gates arranged in a highly specified manner. Circuits may be designed according to custom development methods or automated synthesis processes, such as through computer aided design tools that determine circuit component placement. Custom development methods may provide the best results, but are labor intensive and require a large amount of resources and time. Alternatively, automated synthesis methods may be faster; however, they may not produce the most efficient circuits. For example, automated design processes may not achieve the same component density as a custom design process.

BRIEF SUMMARY

One aspect provides a system comprising: at least one processor; and a memory device operatively connected to the at least one processor; wherein, responsive to execution of program instructions accessible to the at least one processor, the at least one processor is configured to: generate at least one relative order structure based on at least one circuit design layout, the at least one relative order structure comprising at least one placement constraint associated with at least one circuit element; place the at least one circuit element associated with the at least one placement constraint within a circuit design according to the at least one placement constraint; and place circuit elements not associated with the at least one placement constraint within the circuit design.

Another aspect provides a method comprising: generating at least one circuit design via at least one processor accessible by a computing device; wherein generating at least one circuit design comprises: generating at least one relative order structure based on at least one circuit design layout, the at least one relative order structure comprising at least one placement constraint associated with at least one circuit element; placing the at least one circuit element associated with the at least one placement constraint within a circuit design according to the at least one placement constraint; and placing circuit elements not associated with the at least one placement constraint within the circuit design.

A further aspect provides a computer program product comprising: a computer readable storage medium having computer readable program code embodied therewith, the computer readable program code comprising: computer readable program code configured to generate at least one relative order structure based on at least one circuit design layout, the at least one relative order structure comprising at least one placement constraint associated with at least one circuit element; computer readable program code configured to place the at least one circuit element associated with the at least one placement constraint within a circuit design according to the at least one placement constraint; and computer readable program code configured to place circuit elements not associated with the at least one placement constraint within the circuit design.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 8 provides an example of soft custom gate placement for soft custom circuit design configured according to an embodiment.

FIG. 10 provides an example of soft custom instance placement for soft custom circuit design configured according to an embodiment.

DETAILED DESCRIPTION

Figure 1:
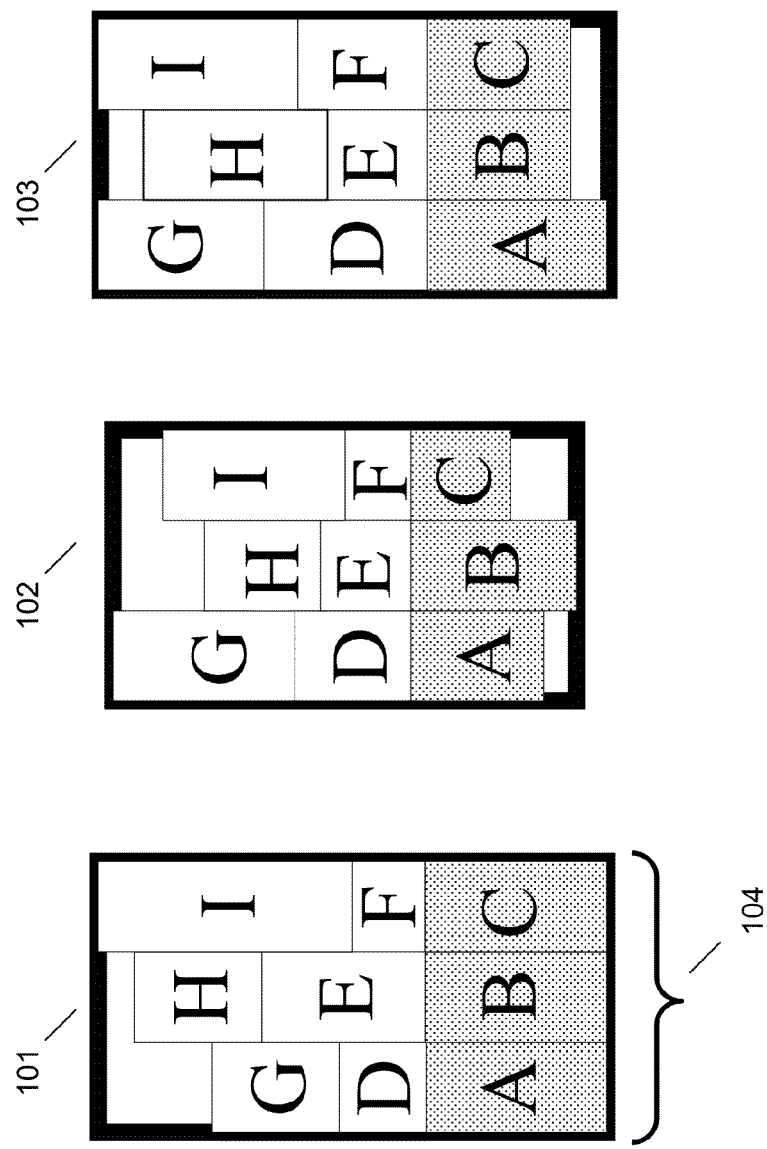
FIG. 1 provides an example of soft custom circuit synthesis according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

In general, circuit synthesis involves generating circuits comprised of multiple components arranged to perform one or more functions. Primary circuit component are logic gates, such as AND, OR, NAND, and NOR gates. Soft customs are circuits composed of a set of gates whose relative locations are pre-defined. In certain configurations, the number of gates inside one soft custom and soft custom dimensions may not be constrained. During physical synthesis, the embedded soft customs may be flattened and the location relationships among custom gates may no longer be maintained. For many circuit applications, it may be beneficial to maintain the relative locations of soft custom gates. For example, when migrating soft custom design from one technology node to another or when reusing soft customs multiple times within the same chip or circuit unit under different constraints. In these exemplary applications, the design of soft customs may be well tuned and the preservation of relative gate ordering may be required.

Existing technologies have addressed the relative gate ordering issue through manual custom designs that impose the location relationship. For example, through opening an editor to manually edit a layout design. Additional commercial tools and academic works have explored relative placement that accepts predefined gate ordering. However, these products are unable to support dynamic gate resizing and alignment constraints. Primary examples include relative placement and layout migration schemes. Relative placement involves hierarchical grouping where cells are grouped into horizontal or vertical groups, support hierarchical groups, or place groups of cells as a big block. In 2D (i.e., two dimensional) array relative placement, relative order is defined as a 2D array, wherein constraints are applied directly in a placement engine. In layout migration placement methods, shape ordering is identified and honored when ordering constructing layouts on different technology nodes, which may be applied to library designs or analog circuits. However, these and other existing placement strategies do not support adequate alignment constraints and dynamic gate resizing for synthesis purposes, nor do they provide a complete design methodology from relative order generation to synthesis with relative order.

Accordingly, embodiments provide for synthesizing soft custom circuits configured to, inter alia, preserve the relative order of circuit components. For example, automated synthesis methods arranged according to embodiments may generate circuits that preserve soft custom placement intent, allow each instance of a soft custom to be uniquely optimized, and do not require soft custom routing, abstract, and timing rule verification. An illustrative and non-restrictive circuit may be comprised of an embedded soft customs flat arranged to maintain soft custom placement relative order.

Circuits developed according to embodiments may be advantageous for multiple uses, including, but not limited to, the following: migrating soft custom designs from one technology node to another; reusing soft custom designs multiple times within the same chip or circuit unit under different constraints; conventional custom design for placement, but flat synthesis at the top level; and initial soft custom synthesis, with placement transposed and refined at the top level. Embodiments provide for one or more soft custom optimization options, such as gate sizing, buffering, logic restructuring, and placement.

Design methodologies provided herein may operate from relative order generation to synthesis with relative order and may be comprised of one or more of the following features: (1) a file format configured to record the gate relative ordering; (2) a scan-line process capable of deriving soft custom relative ordering from a layout; (3) a Linear-Programming (LP) based process configured to search for optimal soft custom placements that may maintain location relationship constraints for one soft custom; (4) an LP based process extended to optimally place both soft customs and gates inside soft customs; and (5) processes configured to address soft custom legalization and situations where no feasible solutions exist.

Referring to FIG. 1, therein is provided an example of soft custom circuit synthesis according to an embodiment. Three instances 101-103 of a soft custom circuit design are depicted in FIG. 1, wherein the gate types and relative ordering are the same, but due to gate resizing, the gate sizes are different. According to soft custom designs arranged according to embodiments, gates A, B, and C 104 may be aligned with their top edges. In addition, when handling placement within soft custom design configured according to embodiments, design instances 101-103 may be configured to satisfy applicable constraints. For example, an instance may be an instance of a particular size (e.g., 22 nm) and embodiments allow for the instance to be automatically designed for a different size (e.g., a smaller size of 14 nm) that maintains the functionality of the instance and the relative order of the gates arranged therein.

Figure 2:
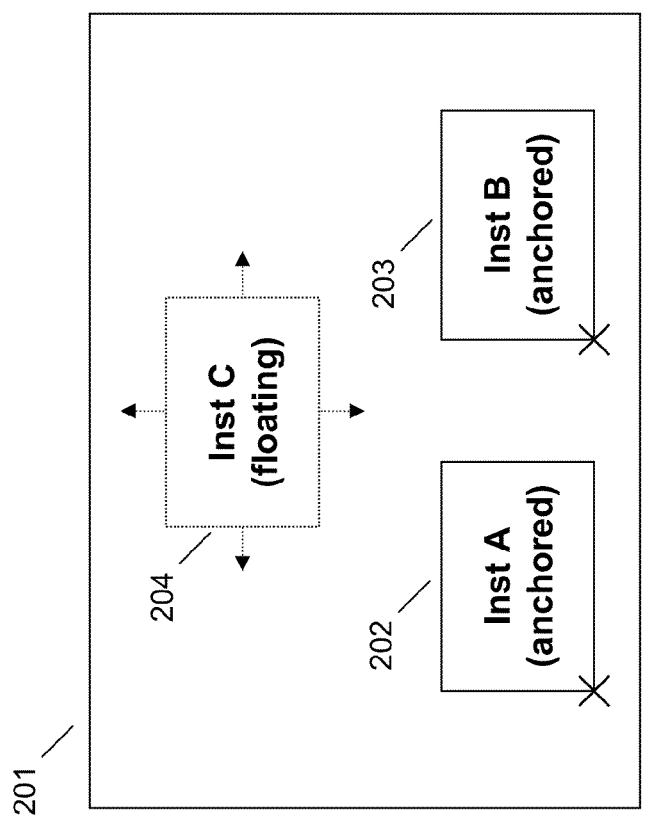
FIG. 2 provides an example of instances of a soft custom circuit design incorporated within a larger design.

Instances of soft custom circuit designs may be utilized alone or incorporated within a larger design. In FIG. 2, therein is provided an example of instances of a soft custom circuit design incorporated within a larger design. Soft custom circuit design instances 202, 203 within a larger design 201 may be anchored therein, for example, to an absolute position. Alternatively, certain instances 204 may be designated as having a floating position within the overall design 201. According to embodiments, if a position is not determined, the location may be calculated based on global placement. The soft custom circuit design locations may be adjusted for legalization except for fixed soft customs. Embodiments provide that the soft custom circuit designs may be viewed as a flat group of instances within a large design wherein each instance may be uniquely resized and/or synthesized.

Figures 3A, 3B:
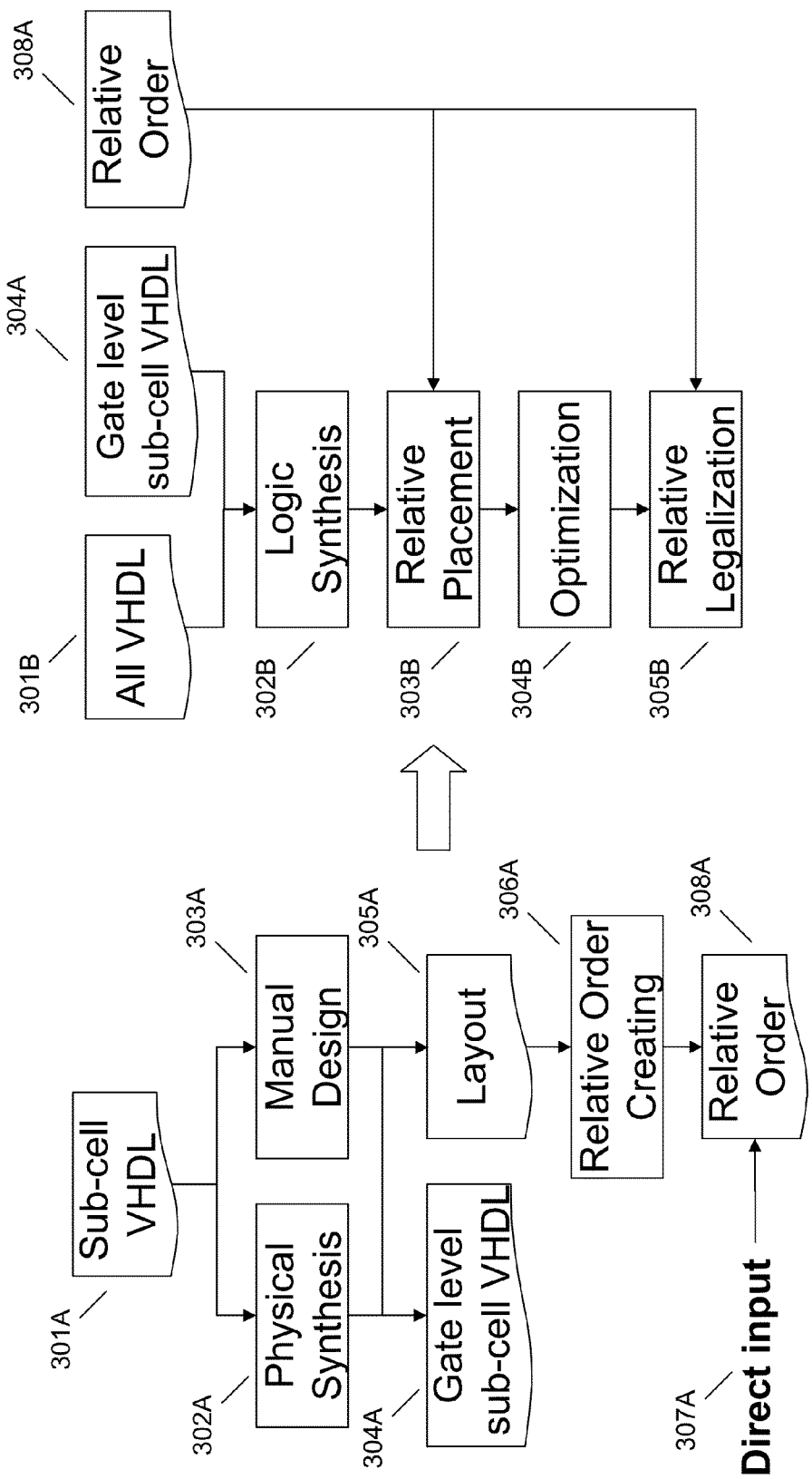
FIGS. 3A and 3B provide example processes for soft custom circuit design synthesis according to embodiments.

Referring to FIGS. 3A and 3B, therein are provided example processes for soft custom circuit design synthesis according to embodiments. The non-limiting examples depicted in FIGS. 3A and 3B utilize the very-high-speed integrated circuits hardware description language (VHDL); however, embodiments are not so limited, as other suitable languages capable of operating according to embodiments are contemplated herein. FIG. 3A depicts an example relative order creation flow process according to an embodiment. A sub-cell VHDL file 301A may be received as input at physical synthesis 302A and manual design 303A processes. These processes 301A, 302A may generate gate level sub-cell VHDL 304A and layout 305A files. The layout 305A file may be utilized by a relative order creation 306A process, in combination with direct input 307A, to produce a relative order file 308A.

In FIG. 3B, therein is provided an example synthesis flow with relative order process configured according to an embodiment. An "all VHDL" file 301B and the gate level sub-cell VHDL file 304A may be received as input at a logic synthesis 302B process which flows, along with the relative order file 308A, into a relative placement process 303B. Output from the relative placement process 303B may be optimized through an optimization process 304B whose output flows, along with the relative order file 308A, into a relative legalization process 305B.

Gate level VHDL may be configured according to embodiments to hide flags to prevent buffering and structure modification when soft custom circuit designs are flattened. Synthesis processes may recognize the hierarchy name of each soft custom circuit design and may apply relative order when placing them. According to embodiments, relative order may be maintained in both global placement and legalization through one or more of the following processes: (1) computing the placement location of each soft custom circuit design, for example, utilizing a floor planning or placement approach; (2) placing gates constructively within each soft custom circuit design by solving equations derived from relative orders; (3) before any legalization, first legalizing soft customs and fixing them. In addition, embodiments provide for an approach that utilizes an LP formulation configured to capture all constraints.

Figure 4:
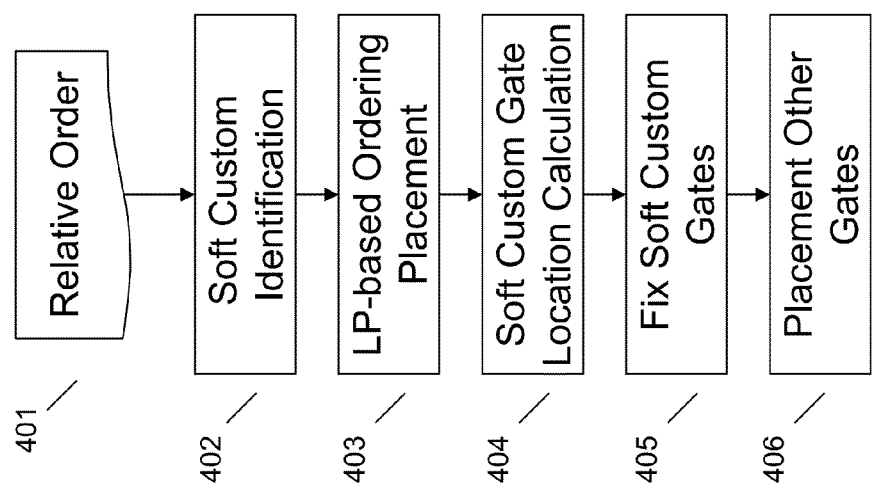
FIG. 4 provides an example relative placement process according to an embodiment.

Referring to FIG. 4, therein is provided an example relative placement process according to an embodiment. A relative order file 401 may be provided to a soft custom circuit design identification process 402. Output from the identification process 402 may be input into an LP-based ordering placement process 403 whose output may flow into a soft custom circuit design gate location calculation process 404. The location calculations 404 may be fixed according to a soft custom circuit design gate fixing process 405, which may be followed by a process for placing any remaining gates 406.

Figure 5:
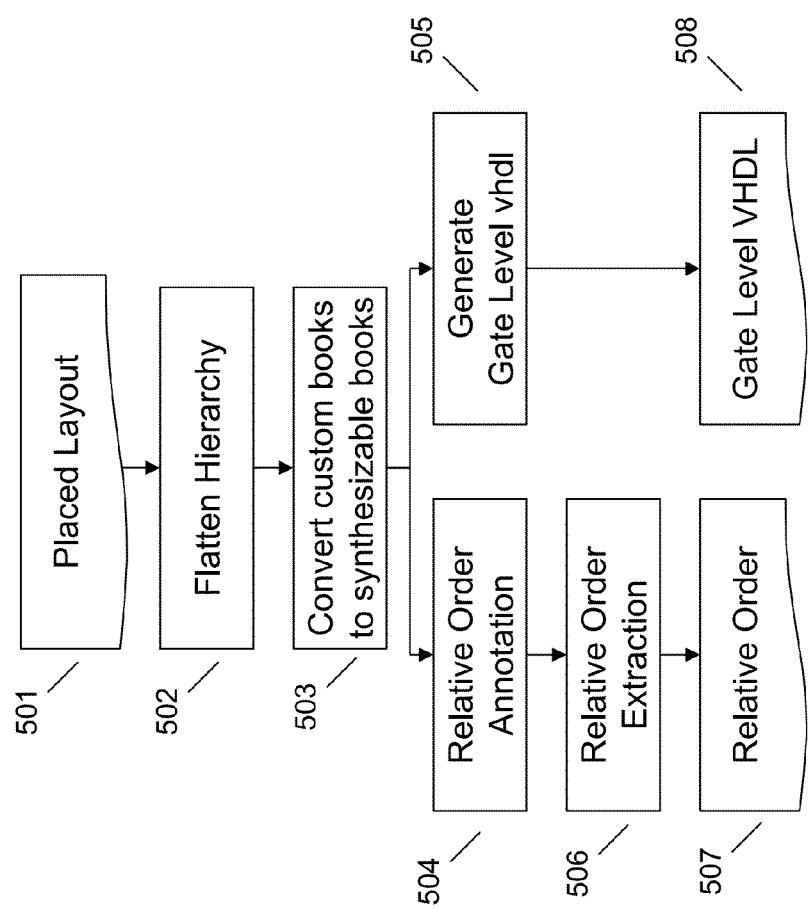
FIG. 5 illustrates an example process for generating relative order and gate level very-high-speed integrated circuits hardware description language (VHDL) files for a soft custom circuit design configured according to an embodiment.

Users generating circuit designs may directly write relative order and gate level VHDL files or they may generate them from an existing layout. FIG. 5 illustrates an example process for generating relative order and gate level VHDL files for a soft custom circuit design configured according to an embodiment. A layout file 501 may be input into a flatten hierarchy process 502 which may flow into a process for converting custom books into synthesizable books 503. According to embodiments, the flatten hierarchy 502 and book conversion 503 may be optional. As such, the layout 501 may be input into a relative order annotation 504 and generate gate level VHDL 505 processes. The relative order annotation 504 process may lead into a relative order extraction process 506 configured to generate a relative order file 507. In addition, the generate gate level VHDL process 505 may generate a gate level VHDL file 508.

Certain elements utilized within soft custom circuit design processes may be configured according to one or more formatted data structures. A non-limiting example of a relative ordering format according to an embodiment is as follows:

```
Digraph name {
    inst1 [ORIENT=A0M0] [LLX=x1][LLY=y1][FIXLOC=true]
    inst2 [ORIENT=A180M0] [LLX=x2][LLY=y2]
    inst1->inst2->inst3 [TYPE=horizontal] [ SPACING=10]
    inst2->inst4 [TYPE=vertical]
    inst3->inst5 [TYPE=align_vertical] [ALIGNMENT=low]
    inst2->inst5 [TYPE=align_horiztonal] [ALIGNMENT=center]
}
```

Figure 6:
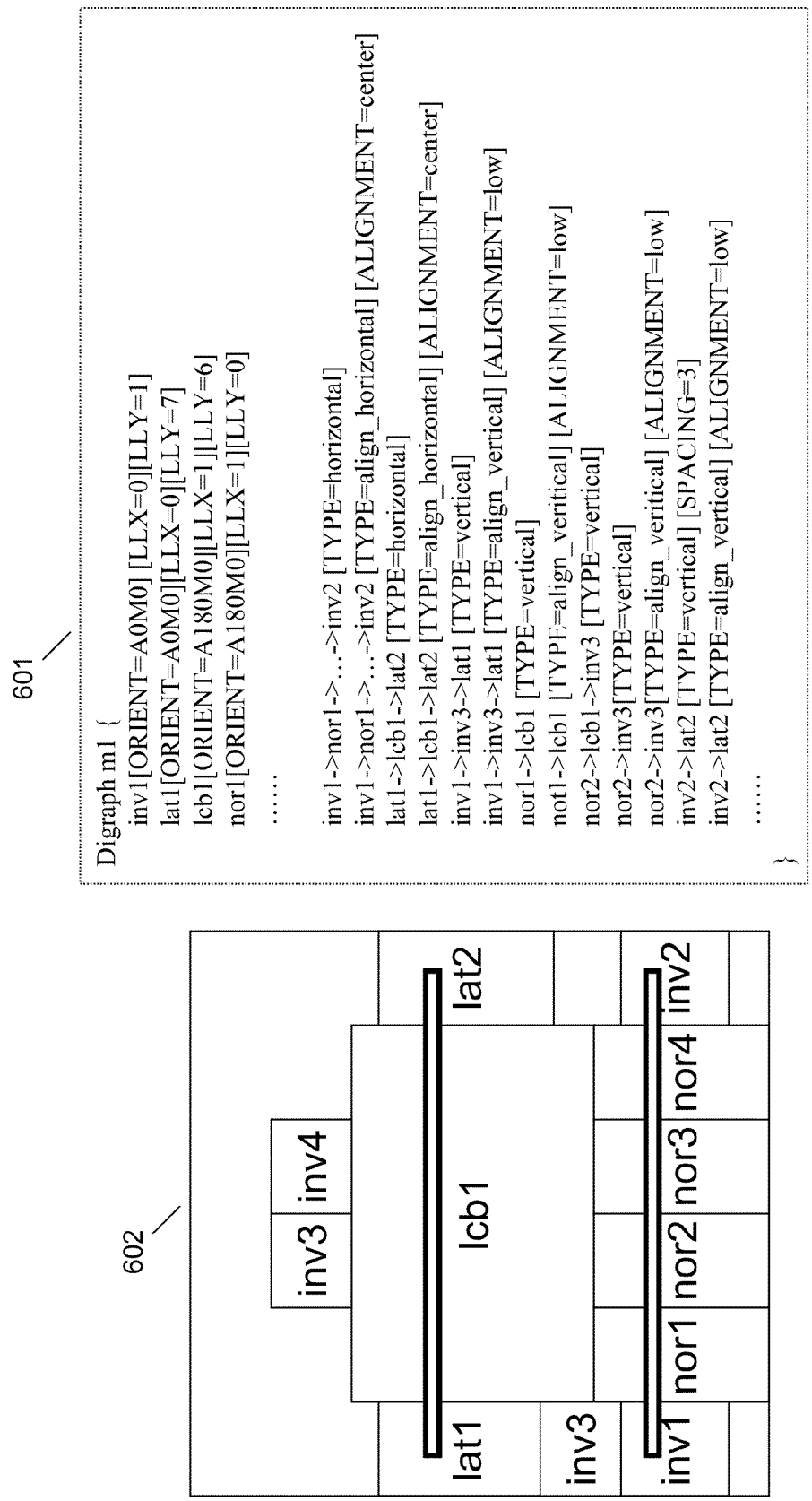
FIG. 6 provides an example relative ordering format and associated soft custom circuit design instance.

Embodiments provide that the ORIENT element may define orientation, for example, A180 may mean "rotate 180," while M1 may mean "mirrored=true." Embodiments contemplate additional possible orientations. LLX and LLY may be configured according to embodiments to define the lower-left location wherein the X unit is the circuit row width and the Y unit is the PC pitch, while FIXLOC may define anchoring locations, if applicable. The TYPE descriptor may provide information regarding positioning and/or alignment, such as horizontal, vertical, alignment vertical, and alignment horizontal. A minimal distance between instances may be specified according to a SPACING variable, for example, for horizontal and vertical types. Alignment of instances may be specified through an ALIGNMENT attribute which may be specified, for example, as low, center, or high. Referring to FIG. 6, therein is provided an example relative ordering format 601 and associated soft custom circuit design instance 602.

Processes described herein may be associated with one or more annotation schemes. For example, an embodiment provides for a relative order annotation system configured to identify and annotate structures on a placed layout, such as layout file 501 depicted in FIG. 5, in order to convey design intent to a relative order file generator. Non-limiting examples of annotations may include horizontal groups, gaps between instances, and connections between components. Illustrative and non-restrictive examples of annotation options include explicitly identifying structures to annotate and processes for identifying structures. In addition, embodiments provide for processes for relative order annotation, wherein for example, groups of instances are identified as having a horizontal relation that should take precedence in the relative order file. A non-limiting example provides for using net connectivity to identify instances wherein net-fanout may be above a particular threshold (e.g., ≥8). From the identified instances, groups may be created that may be placed horizontally.

Figure 7B:
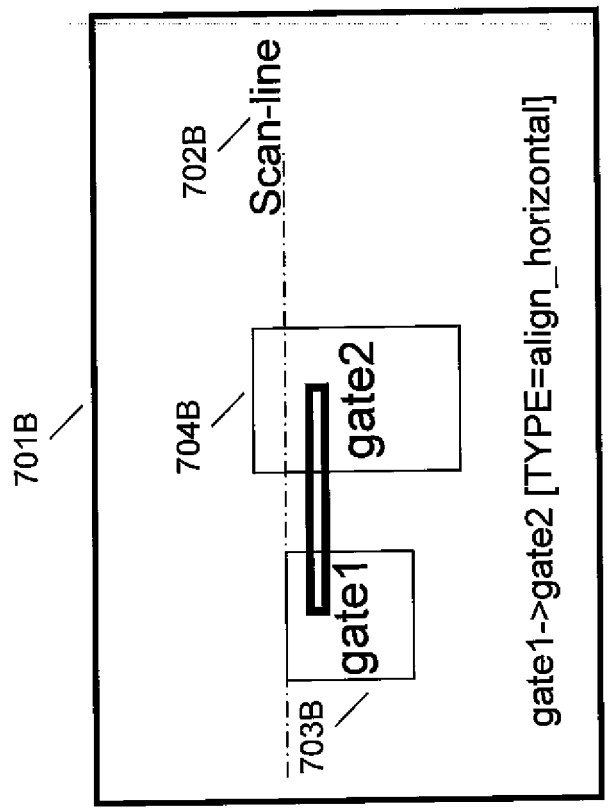
FIGS. 7A and 7B provide example processes for relative order extraction configured according to an embodiment.
Figure 7A:
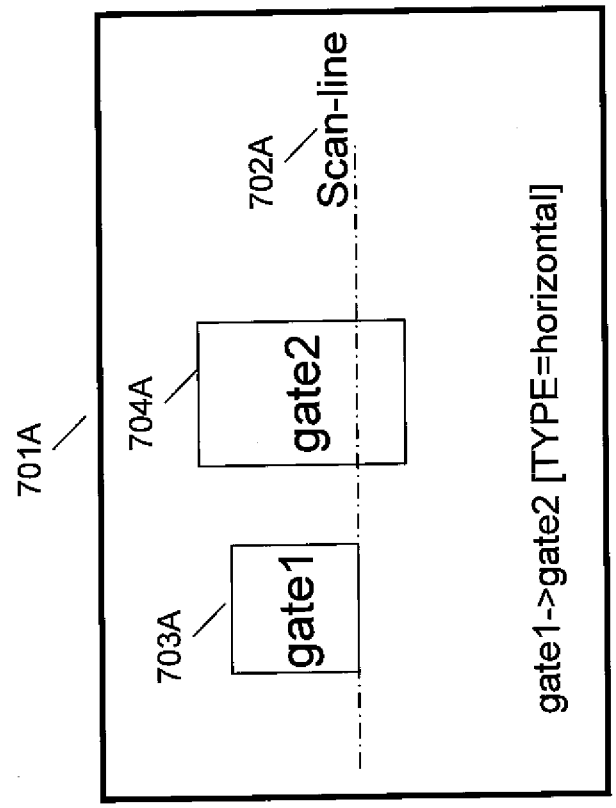

Referring to FIGS. 7A and 7B, therein is provided example processes for relative order extraction configured according to embodiments. The example embodiments of FIGS. 7A and 7B utilize a scan line approach to extract the relative order based on the layouts 701A, 701B. Scan line passes 702A, 702B may be run on the gates 703A, 704A, 703B, 704B provided in the layouts 701A, 701B, in the x direction and the y direction, respectively, to create the relations between the gates 703A, 704A, 703B, 704B. In the example processes depicted in FIGS. 7A and 7B, the relations include horizontal, align_horizontal, vertical, and align_vertical.

FIG. 8 provides an example of soft custom gate placement for a soft custom configured according to an embodiment. As seen in FIG. 8, the gate placement provides processes for both hard constraints and soft constraints. According to embodiments, constraints, such as those depicted in FIG. 8, may be captured by a linear programming (LP) formulation.

Figure 9:
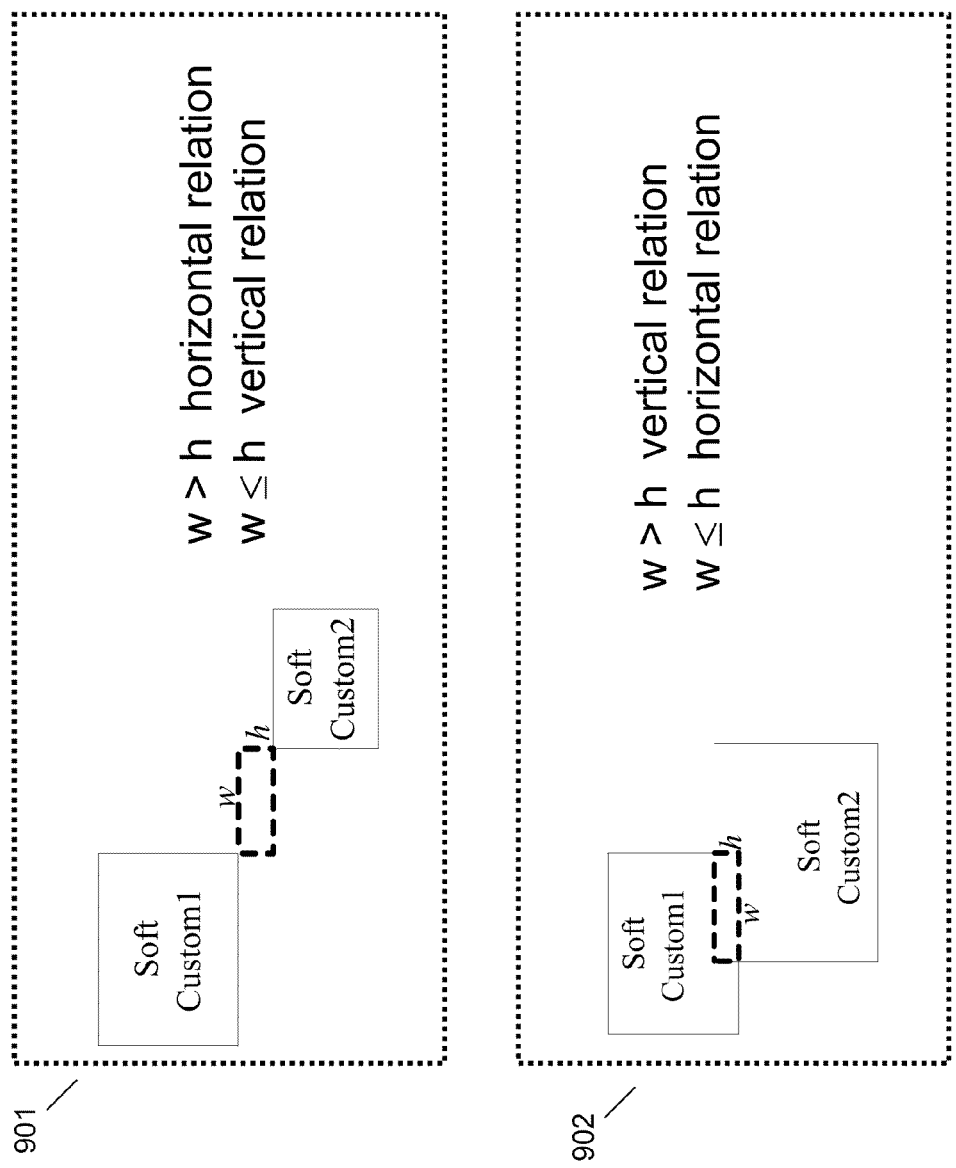
FIG. 9 provides an example process of relative order extraction for soft customs according to an embodiment.

The approach provided in FIG. 8 may be further extended to simultaneously place both soft custom instances and soft custom gates inside soft custom instances. In FIG. 9, therein is provided an example process for relative order extraction of soft custom instance according to an embodiment. According to embodiments, global placement may be applied to all gates. For each soft custom instance, an average location of all gates therein may be calculated and an associated Delaunay triangle generated. According to embodiments, redundant edges may be removed after all edges have been traversed. As shown in FIG. 9, if two nodes are separated 901, their relative ordering may be determined by the width/height representing the amount of separation, as depicted by the dash-rectangle 903. For example, if the width is larger than height, the two nodes may be categorized as having a horizontal relationship; otherwise, the two nodes may be categorized as having a vertical relationship. FIG. 9 additionally depicts a configuration wherein two nodes have no overlap 902. Referring to FIG. 10, therein is provided an example of soft custom instance placement for soft custom circuit design configured according to an embodiment. The combination of processes depicted in FIG. 8 and FIG. 10, provides an example of soft custom placement for both soft custom internal gates and soft custom instances.

Figure 11:
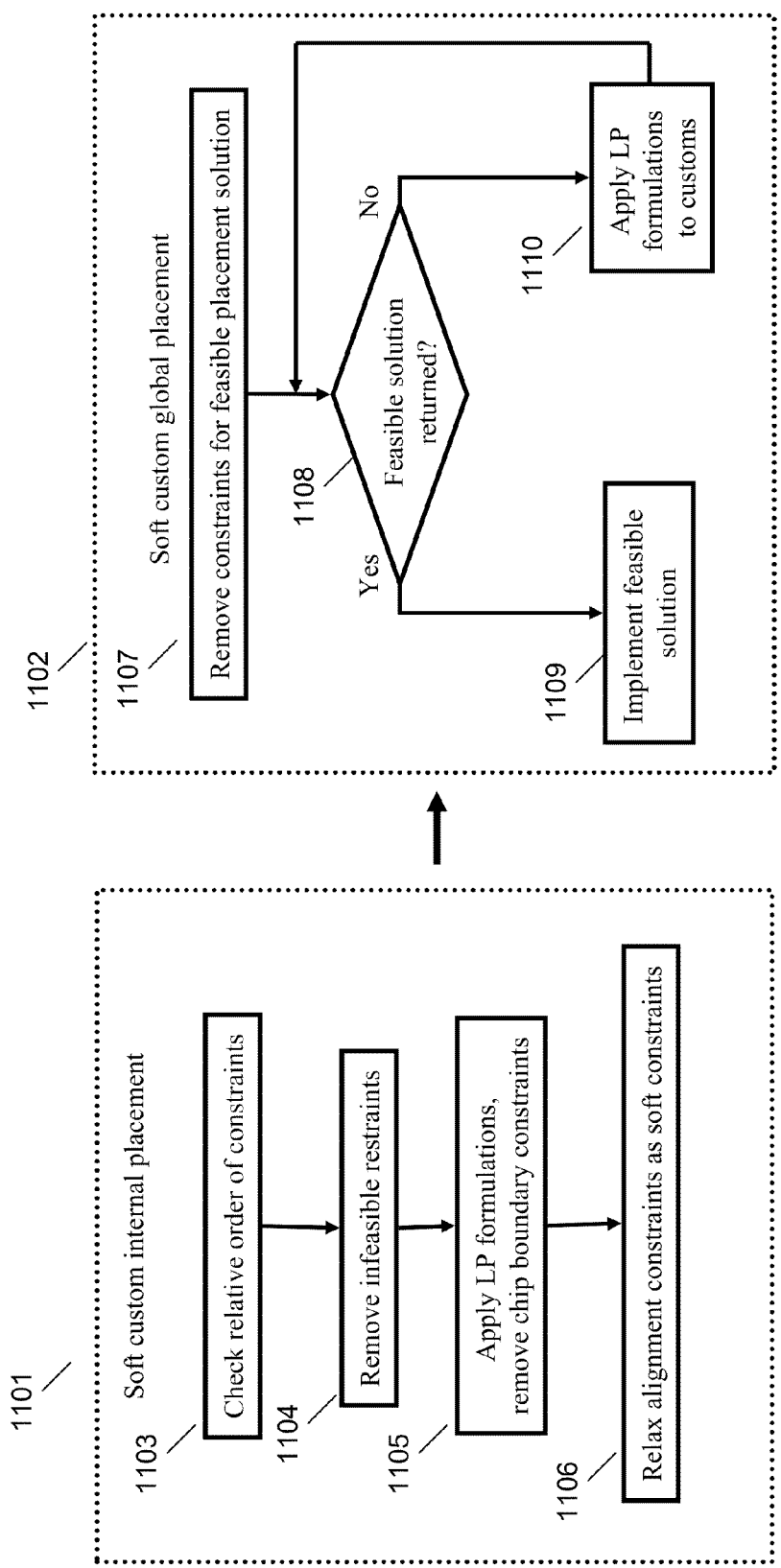
FIG. 11 provides an example process for infeasible solution circuit component placement configured according to an embodiment.

When generating soft custom circuit designs, there may be situations which lead to an infeasible solution. For example, where LP formulation fails and no partial solution is returned. However, a placement solution is needed even if no feasible solution exists. According to embodiments, soft custom circuit design internal placement may be independent of each other and certain constraints (e.g., horizontal and vertical constraints) may not be hard constraints. FIG. 11 provides an example process for infeasible solution circuit component placement configured according to an embodiment. Soft custom internal placement 1101 includes checking the relative ordering of constraints 1103 and removing infeasible constraints 1104 (e.g., A is on the left of B and B is on the left of A). LP formulations may be applied on each soft custom and chip boundary constraints may be removed 1105 followed by further relaxation of alignment constraints as soft constraints 1106. Soft custom global placement 1102 includes applying LP formulations only to customs 1107. If a feasible solution is returned 1108, then it may be implemented 1109; otherwise, the horizontal and vertical constraints may be removed for a feasible placement solution 1110.

Figure 12:
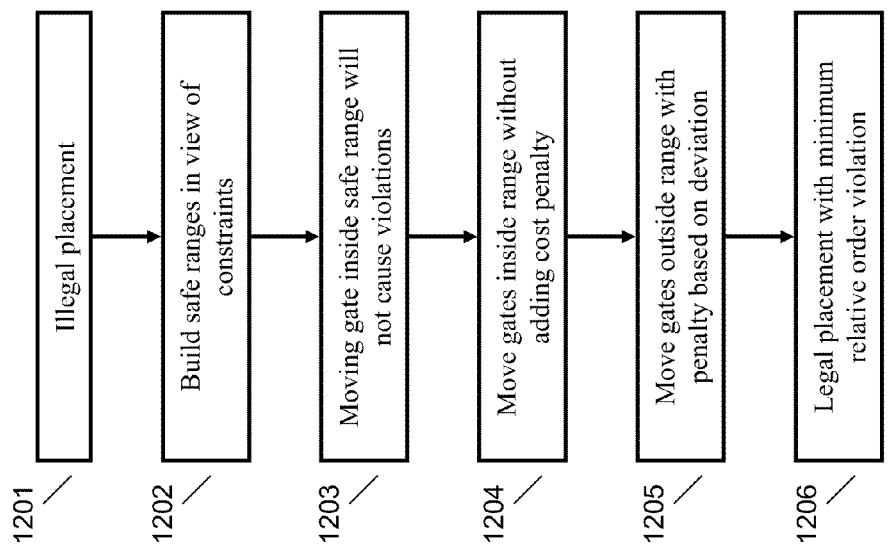
FIG. 12 provided a legalization process according to an embodiment.

Placement within a circuit cell may be legalized, for example, by removing any overlaps and implementing any other standardized placement constraints. Embodiments provide that relative orders may be honored during legalization. Referring to FIG. 12, therein is provided a legalization process according to an embodiment. Legalization process input may be in the form of an illegal placement with relative order constraints 1201. Safe ranges for gates may be built in view of relative order constraints 1202, including ranges wherein a gate may be moved inside a safe range without creating any violations 1203. Conventional legalization may be performed, including moving gates inside of a range without adding a penalty to an existing cost function 1204 and moving a gate outside of a range with an increasing penalty being added based on the deviation 1205. Process output includes legal placement with minimum relative order violation 1206.

Figures 13A, 13B:
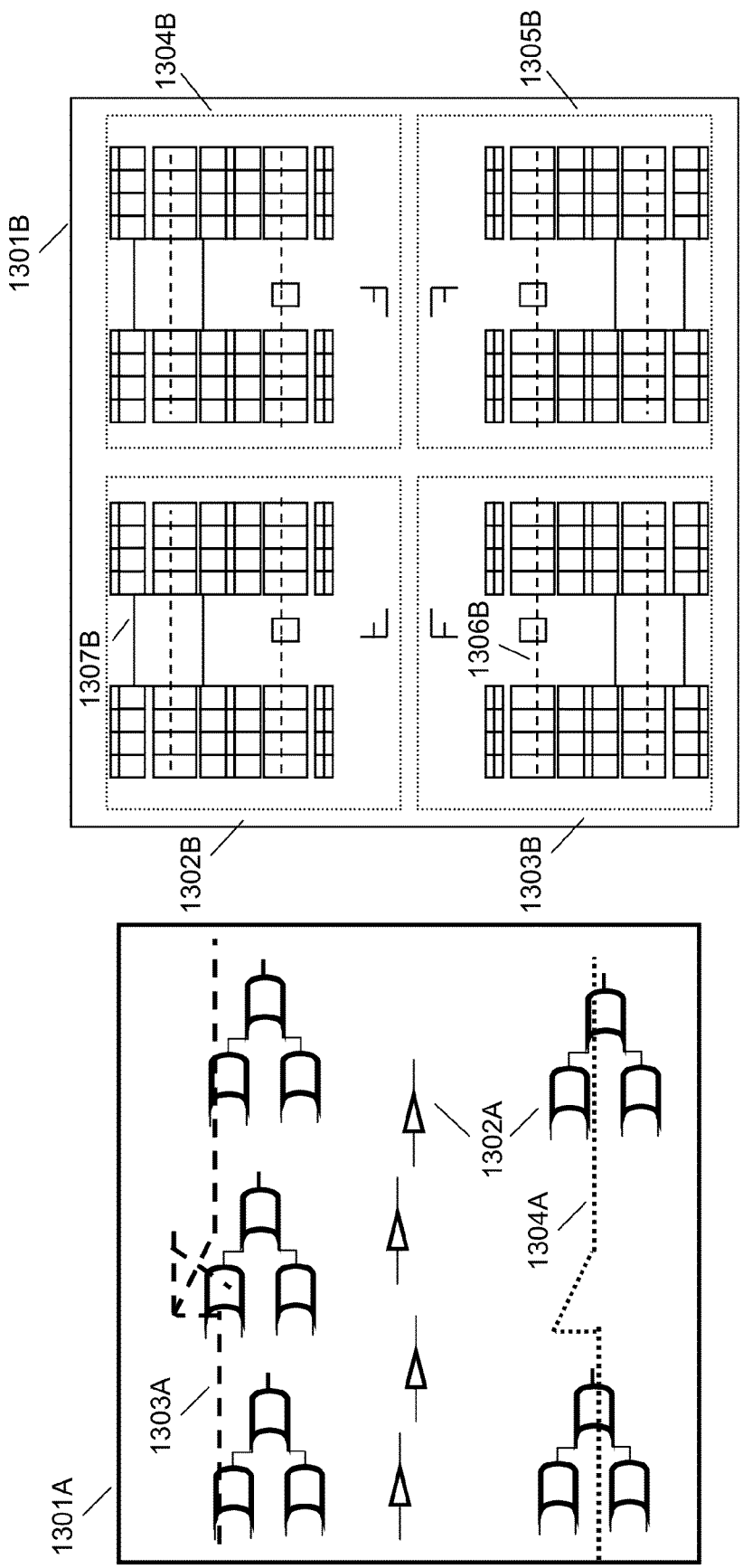
FIGS. 13A and 13B provided an example soft custom and circuit design developed, respectively, according to an embodiment.

Referring to FIGS. 13A and 13B, therein is provided an example soft custom and circuit design developed using multiple soft customs according to an embodiment. The sub-cell 1301A is comprised of multiple gates 1302A, as well as mux select row 1303A and lcb-latch row 1304A horizontal connections. The horizontal connections 1303A, 1304A may operate as an additional constraint, for example, in the relative order annotation configured according to embodiments. As such, the soft custom circuit design depicted in FIG. 13B may be constrained by maintaining alignment along the horizontal connections 1303A, 1304A. The circuit design 1301B is comprised of four instances 1302B, 1303B, 1304B, 1305B of the soft custom 1301A arranged in different positions and orientations. As shown in FIG. 13B, certain connection constraints 1306B, 1307B may be maintained when generating the circuit design 1301B from soft customs 1301A. Embodiments provide that the soft customs may resize under separate conditions, but relative order would be maintained according to the design constraints.

As previously disclosed herein, embodiments provide a relative ordering file format created to capture gate ordering constraints. In addition, embodiments may utilize a scan line approach to create soft custom ordering files. An LP based formulation may be employed according to embodiment to ensure the relative ordering of gates inside each soft custom, for example, through support of various alignment constraints and by honoring given gate locations and soft custom locations.

Figure 14:
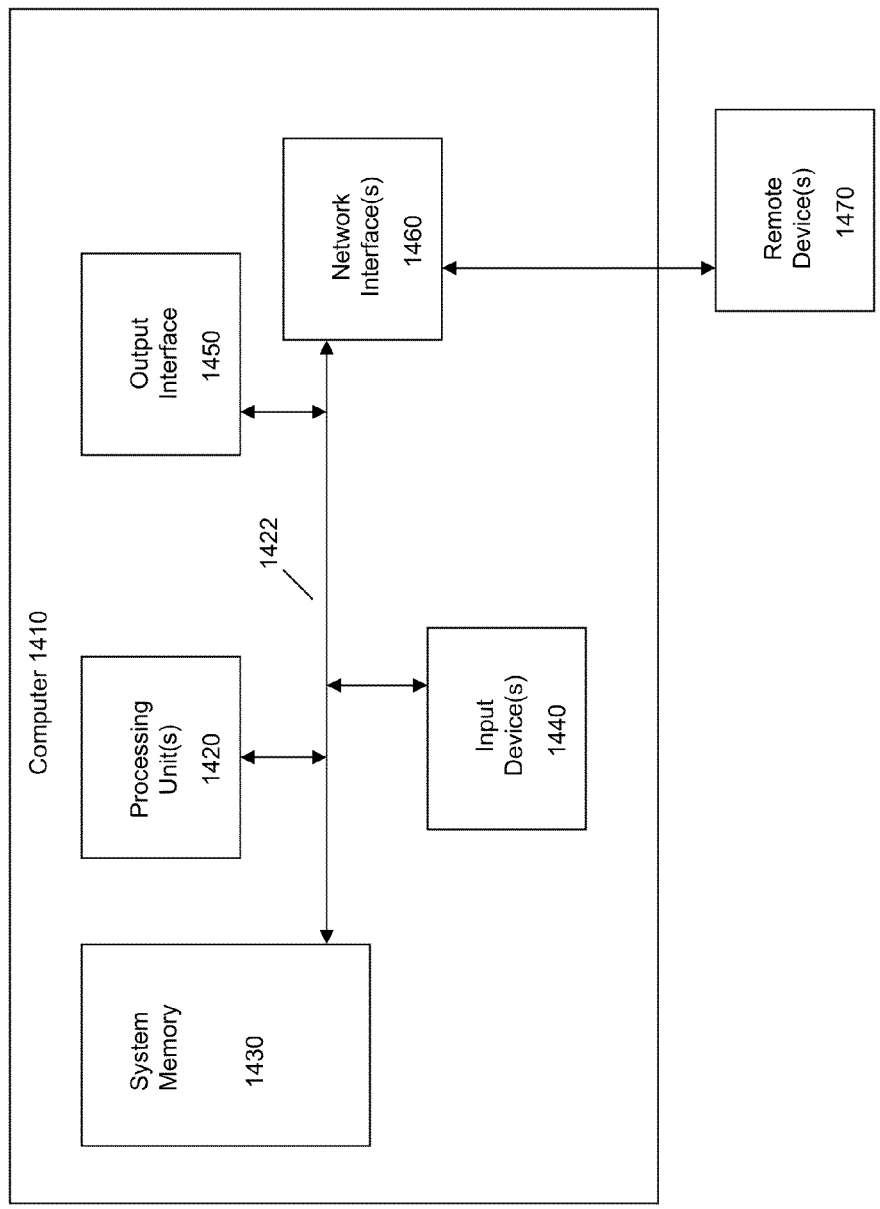
FIG. 14 illustrates an example computing device.

Referring to FIG. 14, it will be readily understood that certain embodiments can be implemented using any of a wide variety of devices or combinations of devices. An example device that may be used in implementing embodiments includes a computing device in the form of a computer 1410, which may take the form of a server, a workstation computer, a mobile device, and the like. In this regard, the computer 1410 may execute program instructions configured to provide predictive placement of content through network analysis, and perform other functionality of the embodiments, as described herein.

Components of computer 1410 may include, but are not limited to, at least one processing unit 1420, a system memory 1430, and a system bus 1422 that couples various system components including the system memory 1430 to the processing unit(s) 1420. The computer 1410 may include or have access to a variety of computer readable media. The system memory 1430 may include computer readable storage media in the form of volatile and/or nonvolatile memory such as read only memory (ROM) and/or random access memory (RAM). By way of example, and not limitation, system memory 1430 may also include an operating system, application programs, other program modules, and program data.

A user can interface with (for example, enter commands and information) the computer 1410 through input devices 1440. A monitor or other type of device can also be connected to the system bus 1422 via an interface, such as an output interface 1450. In addition to a monitor, computers may also include other peripheral output devices. The computer 1410 may operate in a networked or distributed environment using logical connections (network interface 1460) to other remote computers or databases (remote device(s) 1470). The logical connections may include a network, such local area network (LAN), a wide area network (WAN), a cellular network, but may also include other networks.

Those skilled in the art will recognize that aspects may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A system comprising:
   at least one processor; and
   a memory device operatively connected to the at least one processor;
   wherein, responsive to execution of program instructions accessible to the at least one processor, the at least one processor is configured to:
      generate at least one relative order structure based on at least one circuit design layout, the at least one relative order structure comprising at least one placement constraint associated with at least one circuit element;
      place the at least one circuit element associated with the at least one placement constraint within a circuit design according to the at least one placement constraint;
      wherein to place the at least one circuit element comprises legalizing the at least one circuit design, said legalizing comprising determining at least one safe range for placement of the at least one circuit element with respect to the at least one placement constraint; and
      place circuit elements not associated with the at least one placement constraint within the circuit design.

2. The system according to claim 1, wherein the layout is configured utilizing very-high-speed integrated circuits hardware description language.

3. The system according to claim 1, wherein the at least one circuit element comprises a logic gate.

4. The system according to claim 1, wherein the at least one circuit element comprises a soft custom instance.

5. The system according to claim 1, wherein the at least one constraint comprises at least one hard constraint.

6. The system according to claim 5, wherein the at least one hard constraint comprises a horizontal relationship and a vertical relationship.

7. The system according to claim 5, wherein the at least one hard constraint comprises an alignment constraint.

8. The system according to claim 1, wherein the at least one constraint comprises a soft constraint.

9. The system according to claim 8, wherein the soft constraint comprises a center alignment constraint.

10. The system according to claim 1, wherein a linear programming process optimizes placing the at least one circuit element associated with the at least one placement constraint.

11. The system according to claim 1, wherein the at least one relative order structure is generated via applying a scanline approach to the at least one circuit design layout.

12. A method comprising:
  generating at least one circuit design via at least one processor accessible by a computing device;
  wherein generating at least one circuit design comprises:
    generating at least one relative order structure based on at least one circuit design layout, the at least one relative order structure comprising at least one placement constraint associated with at least one circuit element;
    placing the at least one circuit element associated with the at least one placement constraint within a circuit design according to the at least one placement constraint;
    wherein said placing comprises legalizing the at least one circuit design, said legalizing comprising determining at least one safe range for placement of the at least one circuit element with respect to the at least one placement constraint; and
    placing circuit elements not associated with the at least one placement constraint within the circuit design.

13. The method according to claim 12, wherein the layout is configured utilizing very-high-speed integrated circuits hardware description language.

14. The method according to claim 12, wherein the at least one circuit element comprises a logic gate.

15. The method according to claim 12, wherein the at least one circuit element comprises a soft custom instance.

16. The method according to claim 12, wherein the at least one constraint comprises at least one hard constraint.

17. The method according to claim 16, wherein the at least one hard constraint comprises a horizontal relationship and a vertical relationship.

18. The method according to claim 16, wherein the at least one hard constraint comprises an alignment constraint.

19. The method according to claim 12, wherein the at least one constraint comprises a soft constraint.

20. The method according to claim 19, wherein the soft constraint comprises a center alignment constraint.

21. The method according to claim 12, wherein a linear programming process optimizes placing the at least one circuit element associated with the at least one placement constraint.

22. The method according to claim 12, wherein the at least one relative order structure is generated via applying a scan-line approach to the at least one circuit design layout.

23. A computer program product comprising:
  a computer readable storage medium having computer readable program code embodied therewith, the computer readable program code comprising:
    computer readable program code configured to generate at least one relative order structure based on at least one circuit design layout, the at least one relative order structure comprising at least one placement constraint associated with at least one circuit element;
    computer readable program code configured to place the at least one circuit element associated with the at least one placement constraint within a circuit design according to the at least one placement constraint;
    wherein to place the at least one circuit element comprises legalizing the at least one circuit design, said legalizing comprising determining at least one safe range for placement of the at least one circuit element with respect to the at least one placement constraint; and
    computer readable program code configured to place circuit elements not associated with the at least one placement constraint within the circuit design.

* * * * *